United States Patent Office
3,038,484
Patented June 12, 1962

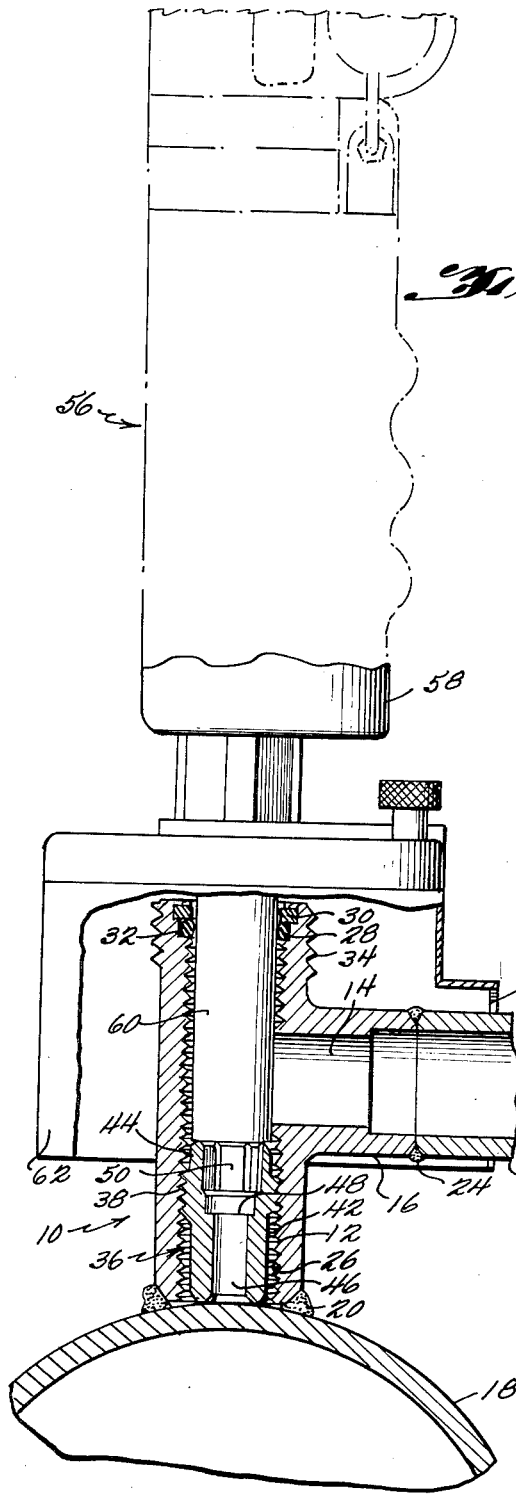

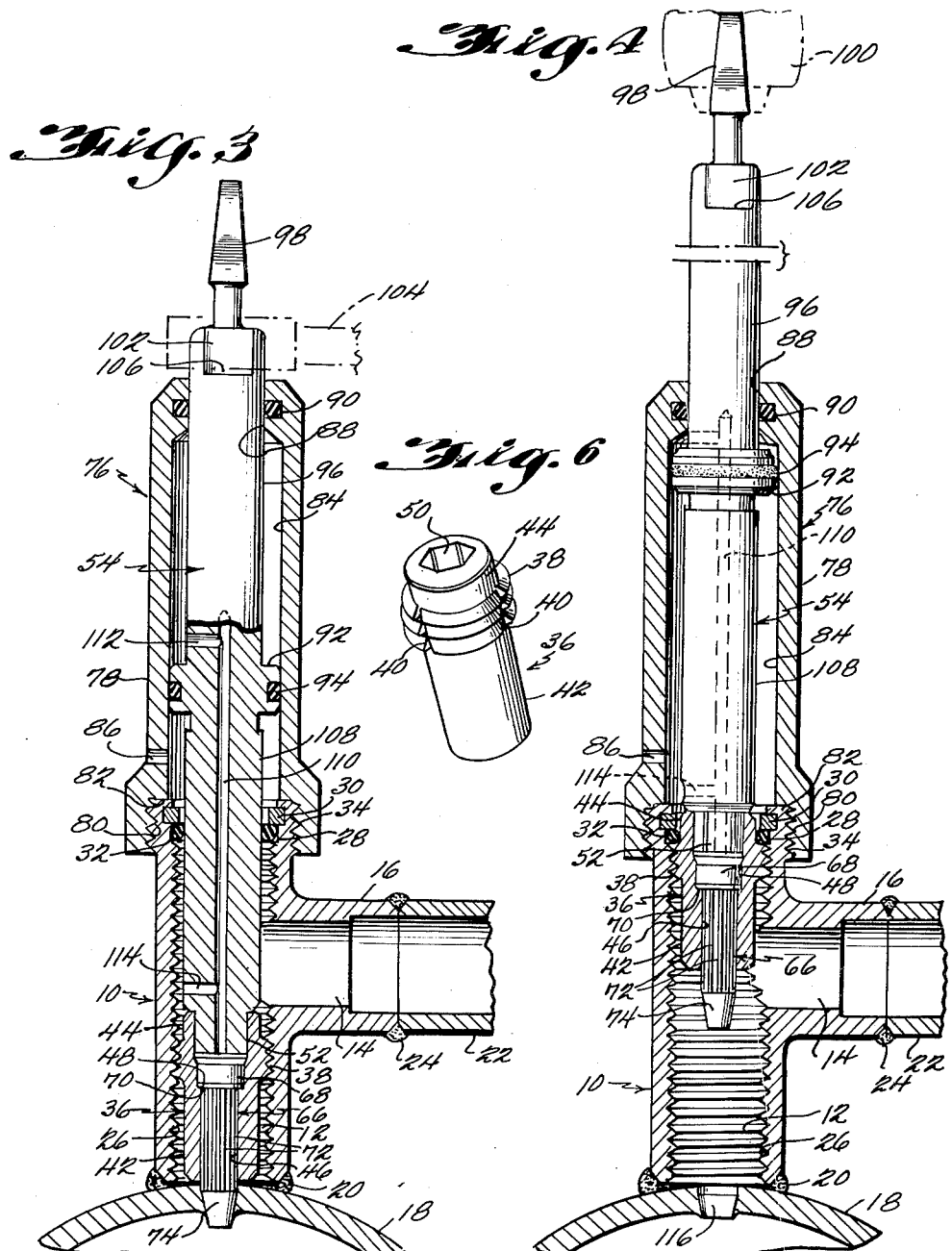

3,038,484
METHOD AND APPARATUS FOR CONNECTING A SERVICE PIPE TO A MAIN
John J. Smith, Decatur, Ill., assignor to Mueller Co., Decatur, Ill., a corporation of Illinois
Filed Dec. 23, 1959, Ser. No. 861,527
11 Claims. (Cl. 137—15)

This invention relates to an improved method and apparatus for connecting a service pipe to a main without escape of fluid from the main to the atmosphere.

Various methods and apparatus for making a connection of the type with which this invention is concerned have long been known in the art. Such methods, however, usually involve drilling a hole in a main by operating through a valve connected to the outer end of a service T secured to the main, and subsequently plugging or closing the outer end of the T by again operating through the valve. Such operations, of course, require the use of a drilling and plugging machine that is connected to the valve. A typical patent that illustrates this method and apparatus for performing the same is one granted to Mueller, No. 1,996,345. Drilling operations, as disclosed in that patent, are laborious and relatively time-consuming. Moreover, after a hole has been drilled in the main to establish service, the drilling machine must be removed from the valve, in order to replace the drill with an appropriate plug and inserting tool therefor, and then re-attached to the valve for conducting the plugging operation, thus consuming even more time to complete the job.

Efforts have been made to provide substantially self-contained tapping T's which do not require the use of a separate drilling and plugging machine or the conducting of drilling and plugging operations through a valve. Such T's have a built-in drill or other type of rotatable tool for forming a hole in a main that can be operated by a simple detachable hand crank. Such T's also have a built-in plug for closing the outer end of the T after the drilling operation has been performed. This type of self-tapping T has proven to be successful in actual practice when used with a plastic main as shown, for example, in the patent to Mueller, No. 2,839,075. The success of the T shown in that patent obviously is due to the fact that it is relatively easy to cut a hole in a plastic main. On the other hand, although it is relatively difficult to cut a hole in an iron or steel main with a self-tapping T, efforts along this line have also been made. For example, in the copending application of Mueller et al., Serial No. 845,550, filed October 9, 1959, there is illustrated a self-tapping service T for use with metal mains. That T, however, requires the use of a drill, so that in actual operation considerable time and effort still will be required to cut a hole in a metal main.

The self-tapping T's shown in the above-mentioned Patent No. 2,839,075 and copending application of Mueller et al., have the additional advantage of having what may be termed a built-in shut-off valve that can be used at any time, after service has been established, to shut off such service.

Accordingly, it is an object of this invention to provide an improved method and apparatus for connecting a service pipe to a main without the necessity of conducting drilling and plugging operations through a valve.

It is another object of this invention to provide an improved method and apparatus for connecting a service pipe to a main with a service T that has a built-in shut off valve and a built-in plug for closing the outer end of the T following the establishment of service.

It is another object of this invention to provide an improved service T which does not require the use of a drill or other type of rotatable tool for forming an opening in a main to establish service.

It is another object of this invention to provide an improved service T which has a built-in shut off valve and a built-in plug and by which a main can be perforated in a novel manner to establish service with a minimum of effort and time consumption.

It is still another object of this invention to provide an improved method for connecting a service pipe to a main with great facility in a minimum of time.

It is a further object of this invention to provide a novel method and apparatus for connecting a service pipe to a main without escape of main fluid to the atmosphere which makes use of an explosively-driven projectile to perforate the main.

Other objects and advantages of the invention will become apparent from the following description and accompanying drawings in which:

FIGURE 1 is a vertical sectional view through a service T embodying this invention and showing the same secured to a main and connected to a service pipe but without the establishment of service. The figure further illustrates the use of a gun for shooting a projectile to perforate the main in order to establish service.

FIGURE 2 is a view corresponding to FIGURE 1 but illustrating the perforation of the main by a projectile preparatory to the establishment of service.

FIGURE 3 is a view corresponding to FIGURE 2 but showing the use of a special tool connected to the T for extracting the projectile from the main to establish service.

FIGURE 4 is a view corresponding to FIGURE 3 but illustrating the position of the parts after service has been established.

FIGURE 5 is a view corresponding to FIGURE 4 but illustrating the special tool removed from the T and the latter provided with a closure cap.

FIGURE 6 is a perspective view of the T plug shown in FIGURE 1.

Referring now to the drawings, and particularly FIGURE 1, there is shown a metal service T 10, of iron or steel, embodying this invention. The T 10 has a through bore 12 intersected between its ends by a lateral outlet 14 surrounded by a tubular boss 16. The inlet end of the T 10 is securely fastened fluid-tight to a main 18, as by welding 20, while a service pipe 22 is connected fluid-tight, as by welding 24, to the boss 16. The through bore 12 of the T 10 is provided for substantially its entire length, with interior threads 26 which terminate somewhat short of the bore outer end. At such outer end, the wall of the bore is provided with a circumferential recess or groove 28, substantially rectangular in radial section. For manufacturing convenience, the groove 28 is formed by providing the outer end of the T with a smooth-walled counterbore. The bottom of such counterbore is provided with another counterbore, and a flat metal washer 30 is secured in the outer counterbore, as by welding or upsetting, to overhang the inner counterbore to form the groove 28. The inner diameter of the washer is smaller than the root diameter of the bore threads 26 and is slightly less than their crest diameter. Within the groove 28 and contacting the bottom thereof, is a resilient packing ring 32, normally circular in radial section and known in the art as an O-ring, which usually is made of a synthetic rubber material, such as neoprene or the like. When relaxed, the inner diameter of the O-ring 32 is less than that of the washer 30 and also less than the crest diameter of the bore threads 26. At its outer end the T 10 is provided with exterior threads 34 which terminate somewhat short of the outer terminal flat end face of the T.

A tubular metal plug 36, of iron or steel, is disposed within the bore 12 and has exterior threads 38 engaged with the bore threads 26. One or more longitudinal flutes 40 interrupt the plug threads 38 for their entire length, as shown in FIGURE 6, for reasons later described. The plug threads 38 terminate short of both ends of the plug and the latter is provided, beyond the threads 38, with inner and outer section 42 and 44 having smooth exterior cylindrical surfaces of less diameter than the crest diameter of the bore threads 26. The diameter of the outer section 44 is slightly less than the inner diameter of the washer 30, but slightly greater than the inner diameter of the O-ring 32, when relaxed, for sealing engagement therewith, as later explained.

Extending coaxially through the plug 36 is a bore 46 provided, at its outer end, with a counterbore that defines an outwardly facing shoulder 48. Outwardly beyond the counterbore the plug is interiorly enlarged and provided with non-circular interior side walls, such as the hexagonal configuration 50 shown in FIGURE 6, for the reception of a complementarily-shaped hexagonal end 52 of a special wrench or turning tool, as shown in FIGURES 3 and 4.

The method involved here includes the perforation of the wall of the main 18 with an explosively-driven projectile. For this purpose there is used a somewhat conventional gun 56 having a frame 58 and a cylindrical barrel of slightly smaller outer diameter than the inner diameter of the washer 30 and of the crest of the bore threads 26. The gun barrel 60 is long enough to be inserted within the T bore 12, from its outer end, and to extend into abutting engagement with the outer end of the plug 36 when the latter is in a forward or inner position in substantially abutting engagement with main 18, as shown in FIGURE 1. The gun frame 58 preferably is provided with a protective shield 62 which surrounds the barrel 60 and is open at its forward end in order to enclose the T 10. At one side, the shield 62 is notched, as at 64, to accommodate the service pipe 22. The gun 56 is of the type wherein the barrel 60 is slidable rearwardly relative to the frame 58 to operate a safety arrangement which prevents the gun from being fired until the barrel has been pushed rearwardly into the frame. Thus, in operation, the barrel 60 is inserted into the T bore 12 into engagement with the plug and in alignment with the plug bore 46. The frame 58 is then pushed forwardly toward the T 10, so that the aforementioned relative movement between the frame and the barrel 60 takes place to permit the gun to be fired.

A gun of the foregoing type is disclosed in somewhat more detail in a brochure entitled "Ramset Fastening System," copyrighted 1957 by Ramset Fastening System, Winchester-Western Division, Olin Mathieson Chemical Corporation 12117 Berea Road, Cleveland 11, Ohio (now moved to: 289 Winchester Avenue, New Haven 4, Connecticut).

The gun 56 is adapted to fire a projectile 66 which will penetrate the wall of the main 18, as shown in FIGURE 2, but be stopped in its forward movement so that it will stick in the plug 36 and form a fluid seal therewith. Thus, the projectile 66, adjacent its rearward end, is provided with a circumferential enlargement or head 68 adapted to fit within the counterbore in the plug. Such head 68 defines a forwardly facing stop shoulder 70 adapted to engage the plug bore shoulder 48 to stop forward movement of the projectile. The diameter of the projectile 66, forwardly of the head 68, is slightly larger than that of the plug bore 46 so that the projectile will be driven thereinto with a force fit, preferably so tight that a pull of several thousand pounds would be necessary to extract the projectile from the plug. Additionally, the projectile 66 preferably is provided with longitudinal flutes 72, of a length not exceeding that of the plug bore 12, so that after the projectile has been driven into such bore, the projectile will be fixed to the plug 36 for rotation therewith when the latter is unscrewed to extract the projectile from the main 18 as later described.

The length of the projectile 66 is such that when the plug 36 is in its forward position, in substantial engagement with the main 18, and the projectile has been fired into the plug bore 46, the forward end of the projectile will extend through the wall of the main 18, as shown in FIGURE 2. The forward end of the projectile 66 preferably is forwardly-tapered as at 74, e.g., frustoconical, and terminates in a flat end face. This configuration provides a punch-like action to aid in penetrating the main 18. At the same time, the taper 74 on the forward end of the projectile 66 facilitates extraction thereof from the main 18, as later described.

The exact dimensions of the projectile 66 and plug bore 46 preferably are correlated so that most of the energy employed in driving the projectile is expended in forcing the latter into the plug, with only a fraction of such energy being used to drive the projectile through the wall of a main. Thus it becomes possible to use a standard powder charge for penetrating mains of different wall thicknesses.

After the projectile 66 has been explosively driven into the plug 36 and penetrates the main 18, as shown in FIGURE 2, the gun 56 is removed and a special extracting machine 76 is attached to the outer end of the T 10, as shown in FIGURE 3. This machine 76, which has a pressure-counterbalancing feature similar to that shown in the patent to Mueller et al. No. 2,829,429, includes a barrel 78 having an open forward end provided with interior threads 80 engageable with the exterior threads 34 on the outer end of the T 10, as shown in FIGURE 3, in order to attach the machine to the T. The inner end of the threads 80 terminates in a forwardly facing shoulder 82 engageable with the outer flat end face of the T10 in order to limit the extent of engagement of the T and machine threads 34 and 80 to a constant fixed amount. Inwardly of the shoulder 82, the interior of the barrel 78 defines a cylinder 84 that is vented, at its forward end, to the atmosphere through a radial port 86 in the wall of the barrel. At its rearward end, the barrel 78 is provided with a coaxial circular opening 88 of less diameter than that of the cylinder 84. The wall of the opening 88 is provided with a circumferential groove within which is disposed an O-ring 90 of an inner diameter, when relaxed, somewhat smaller than that of the opening 88.

Extending through the barrel 78 for free rotation and reciprocation relative thereto is the extracting tool 54 in the form of a plunger having an enlargement between its ends that defines a piston 92 cooperable with the cylinder 84. A suitable seal between the piston 92 and the cylinder 84 may be provided by means of an O-ring 94 disposed in a circumferential groove in the piston. Rearwardly of the piston 92 the plunger 54 is provided with a smooth-walled cylindrical section 96 which extends through the opening 88 and has a diameter slightly greater than that of the inner diameter of the O-ring 90, when relaxed, so as to sealingly engage therewith. At its outer end, the plunger 54 may be provided with an extension 98 of reduced and non-circular configuration for engagement by an appropriate turning tool, such as the chuck of a bit brace 100. The end of the section 96 preferably is provided with a pair of diametrically opposite flats 102 for engagement by an appropriate wrench 104 (FIGURE 3) capable of imparting a high turning torque to the tool 54. The shoulder 106 defined by the forward ends of the flats 102 cooperates with the flat rearward end of the barrel 78 for indicia purposes as later described.

Forwardly of the piston 92, the plunger 54 is provided with a smooth-walled cylindrical section 108 of a diameter slightly less than the inner diameter of the washer 30, but slightly greater than the inner diameter of the T O-ring 32, when relaxed, so as to have sealing engagement therewith. The forward end of the plunger 54 terminates in the section 52 of reduced noncircular configuration complementary to and for snug reception within the outer end of the plug 36 for driving engagement therewith.

Extending into the plunger 54 from its forward end is a passageway 110 which terminates just beyond the piston 92 and is provided at its inner end with a radial port 112 and just rearwardly of the forward wrench end 52 with another radial port 114 to provide communication between the cylinder 84, rearwardly of the piston, and the forward end of the plunger. Preferably, the cross-sectional area of the piston 92 exposed to pressure in the rearward portion of the cylinder 84 is approximately equal to the cross-sectional area of the forward section 108 of the plunger.

After the barrel 78 of the machine 76 has been connected to the T 10, the plunger 54 is moved forwardly until its reduced wrench-like end 52 is fitted within the outer end of the plug 36, as shown in FIGURE 3. In this position, it will be seen that the O-ring 32 effects a tight seal with the forward section 108 of the plunger. It also will be seen that in this position of the parts the shoulders 106 formed by the forward ends of the flats 102 are disposed substantially flush with the rearward end of the barrel 78. In the event that the projectile 66 has not been driven sufficiently forward to penetrate the main 18, the rearward end of the projectile will prevent the wrench-like end 52 of the plunger 54 from being properly received within the plug 36. On such occurrence, the position of the shoulders 106 relative to the rearward end of the barrel 78 will indicate that the main 18 has not been properly perforated.

On proper perforation, however, the high torque wrench 104 is engaged with the flats 102 and the tool 54 is turned in a direction to unscrew the plug 36, i.e., rotate the latter in a direction to cause its withdrawal from the main 18. Such withdrawal or retraction of the plug 36 will pull the projectile 66 out of the main 18 because of the interengagement of the shoulders 70 and 48 on the projectile and plug. After the projectile 66 has been loosened from the main 18 by the high torque wrench 104, the latter can be replaced by a bit brace 100 engaged with the plunger extension 98 so as to rotate the plunger 54 rapidly and unscrew the plug 36 into its fully retracted position shown in FIGURE 4. In such position, the T bore 12, between its inlet end and the lateral outlet 14 is unobstructed so that service is established, i.e., fluid from the main 18 can flow through the T 10 into the service pipe 22. It also will be seen that in such position of the plug 36, its rearward cylindrical section 44 effects a tight seal with the O-ring 32. It further will be seen that because the inner diameter of the washer 30 is less than the crest diameter of the plug threads 38, the plug 36 cannot inadvertently be unscrewed completely out of the T 10. Of course, the O-ring 32 also contributes to the prevention of such an occurrence.

During rotation of the plug 36 to move it rearwardly in the T 10, it will be seen that the pressure of the fluid in the main 18 will enter the T 10 through the hole 116 in the main 18 made by the projectile 66, and pass between the plug and T threads 38 and 26 and through the plug flutes 40 into the T bore 12 rearwardly of the plug 36. Thus, the fluid pressure forces acting against the opposite ends of the plug 36 will be substantially equal. The plug flutes 40 are particularly helpful in this connection in facilitating the equalization of pressure in the T bore 12 at the opposite ends of the plug 36. At the same time, however, it will be seen that main pressure in the T bore 12 above or rearwardly of the plug 36 will act on the cross-sectional area of the forward section 108 of the tool 54 and urge it rearwardly. This same pressure, however, will be communicated through the ports 112 and 114 and passageway 110 into the cylinder 84 to the rear of the piston 92 and will exert a force on the latter which tends to urge the plunger 54 forwardly. These two pressure forces acting on the tool will substantially counterbalance each other. Consequently, not only can the plug be turned and retracted easily, but also the tool can be manipulated with ease with no tendency to be pushed rearwardly out of the T by fluid pressure.

When the plug 36 reaches the fully retracted position shown in FIGURE 4, the machine 76 is then disconnected, and removed from the T 10, and preferably is replaced by a closure cap 116', as shown in FIGURE 5, to protect the outer end of the plug 36, and the O-ring 32 from dirt, weather and the like. If at any time thereafter it is desired to shut off the service, it is a simple matter to reconnect the machine 76 to the T 10, engage the tool 54 with the plug 36, and screw the latter forwardly until the projectile 66 fits tightly in, and thus effectively plugs, the hole 116 in the main 18. In this connection, it will be seen that the bore threads 26 possibly will become slightly corroded after a long period of disuse. The flutes 40 in the plug threads 38, however, have a tapping action which will clean the bore threads 26 as the plug 36 is rotated. Hence, the plug 36 can be screwed forwardly into a shut-off position without undue effort on the part of an operator.

It thus will be seen that the objects of this invention have been fully and effectively accomplished. It will be realized, however, that the foregoing specific embodiment has been shown and described only for the purpose of illustrating the principles of this invention and is subject to extensive change without departure from such principles. Therefore, this invention includes all modifications encompassed within the spirit and scope of the following claims.

I claim:

1. The method of connecting a service pipe to a main and establishing service without the escape of fluid from the main to the atmosphere, the steps comprising: securing radially and fluid-tight to a main a service T having an interiorly threaded through bore, a lateral outlet, and a plug threadedly engaged with the bore and movable from a forward position adjacent the main to a retracted position on the other side of the outlet; moving the plug to its forward position; connecting a service pipe fluid-tight to the lateral outlet; shooting a projectile into the plug in a manner so that the projectile extends through the plug and penetrates the wall of the main but becomes tightly fitted fluid-tight in the plug without passage completely therethrough; and moving the plug to its retracted position to thereby pull the projectile out of the main with the plug and establish service from the main to the service pipe.

2. The method of connecting a service pipe to a main and establishing service without the escape of fluid from the main to the atmosphere, the steps comprising: securing radially and fluid-tight to a main a service T having an interiorly threaded through bore, a lateral outlet, and a plug having an aperture therethrough threadedly engaged with the bore and movable from a forward position adjacent the main to a retracted position on the other side of the outlet; moving the plug to its forward position; connecting a service pipe fluid-tight to the lateral outlet; shooting into the plug aperture a projectile of greater maximum transverse section so that the projectile extends through the plug and penetrates the wall of the main but becomes tightly fitted fluid-tight in the plug without passage completely therethrough; and moving the plug to its retracted position to thereby pull the projectile out of the main with the plug and establish service from the main to the service pipe.

3. The method of connecting a service pipe to a main and establishing service without the escape of fluid from the main to the atmosphere, the steps comprising: securing radially and fluid-tight to a main a service T having a through bore, a lateral outlet, and a plug within and adjustable along the bore from a forward position adjacent the main to a retracted position on the other side of the outlet; moving the plug to its forward position; connecting a service pipe fluid-tight to the lateral outlet; shooting a projectile into the plug in a manner so that the projectile extends through the plug and penetrates the wall of the main but becomes tightly fitted fluid-tight in the plug without passage completely therethrough; and moving the plug to its rearward position to thereby pull the projectile out of the main with the plug and establish service from the main to the service pipe.

4. The method of connecting a service pipe to a main and establishing service without the escape of fluid from the main to the atmosphere, the steps comprising: securing radially and fluid-tight to a main a service T having a through bore, a lateral outlet, and a plug within and adjustable along the bore from a forward position adjacent the main to a retracted position on the other side of the outlet; connecting a service pipe fluid-tight to the lateral outlet; shooting a projectile into the plug in a manner so that the projectile extends through the plug and penetrates the wall of the main but becomes tightly fitted fluid-tight in the plug without passage completely therethrough; moving the plug to its retracted position to thereby pull the projectile out of the main with the plug and establish service from the main to the service pipe while maintaining a seal between the outer end of the bore and the atmosphere and sealing the retracted plug to the bore.

5. An assembly for connecting a service pipe to a main without escape of fluid from the latter to the atmosphere, comprising: a metal service having a through bore, a lateral outlet, and interior threads in said bore extending on opposite sides of said outlet, said T at one end of said bore being adapted to be secured fluid-tight to a main; and a plug having exterior threads engaged with said bore threads, and movable by rotation from a forward position on one side of said outlet adjacent said bore one end to a retracted position substantially on the other side of said outlet, said plug having an unobstructed longitudinal aperture therethrough adapted to have a main-penetrating projectile fired thereinto for a sealing and force fit therein and for projecting beyond said plug and penetrating the wall of the main when the plug is in its forward position, and said plug having non-circular means engageable by a turning-tool insertable through the other end of said bore to rotate said plug; a gun having a barrel adapted to be inserted into said other bore end for firing a main-penetrating projectile into said plug aperture; and a cartridge to be fired by said gun, said cartridge including a projectile having a minimum transverse section greater than that of said plug aperture, whereby said projectile will have a tight sealing fit in said aperture without passage completely therethrough.

6. An assembly for connecting a service pipe to a main without escape of fluid from the latter to the atmosphere, comprising: a service T having a through bore, a lateral outlet, and interior threads in said bore extending on opposite sides of said outlet, said T at one end of said bore being adapted to be secured fluid-tight to a main; a plug having exterior threads engaged with said bore threads and movable by rotation from a forward position on one side of said outlet adjacent said bore one end to a retracted position substantially on the other side of said outlet, said plug having a longitudinal aperture extending therethrough and noncircular means engageable by a turning-tool insertable through the other end of said bore to rotate said plug; and a projectile adapted to be fired into said plug aperture to extend therethrough and penetrate the wall of a main when said T is secured thereto and said plug is in its forward position, the minimum transverse section of said projectile being greater than that of said aperture whereby said projectile will have a tight sealing fit in said aperture without passage completely therethrough.

7. The structure defined in claim 6 including interengageable shoulders on the plug and on the projectile to restrain the latter against passage completely through the plug aperture but permit projection therebeyond for penetrating the wall of the main.

8. The structure defined in claim 7 in which the noncircular means comprises a noncircular interior enlargement registering with and of larger transverse section than the plug aperture to define the shoulder on the plug.

9. The structure defined in claim 6 including at least one longitudinal flute interrupting and extending the entire length of the plug threads.

10. The structure defined in claim 9 in which the wall of the bore is provided adjacent its other end with an interior circumferential groove, and including a resilient sealing ring in said groove of an inner diameter less than that of the crest of the bore threads, said ring being adapted to engage the plug in its retracted position and form a seal between said bore and the periphery of said plug.

11. An assembly for connecting a service pipe to a main without escape of fluid from the latter to the atmosphere, comprising: a metal service T having a through bore, a lateral outlet, and interior threads in said bore extending on opposite sides of said outlet, said T at one end of said bore being adapted to be secured fluid-tight to a main and the wall of said bore adjacent the other end thereof being provided with an interior circumferential groove; a resilient sealing ring in said groove of an inner diameter less than that of the crest of said bore threads; a metal plug having exterior threads engaged with said bore threads and movable by rotation from a forward position on one side of said outlet adjacent said bore one end to a retracted position substantially on the other side of said outlet, said plug having noncircular means engageable by a turning tool insertable through the other end of said bore to rotate said plug, and said plug having an unobstructed longitudinal aperture therethrough adapted to have a main-penetrating projectile fired thereinto for a sealing and force-fit therein and for projecting beyond said plug and penetrating the wall of the main when said plug is in its forward position; a projectile adapted to be fired into said plug aperture and to extend therethrough and penetrate the wall of a main when said T is secured thereto and said plug is in its forward position, the minimum transverse section of said projectile being greater than that of said aperture whereby said projectile will have a tight sealing fit in said aperture without passage completely therethrough; and a machine for rotating said plug including a barrel having an open forward end adapted to be detachably connected to said T adjacent said bore other end and in alignment with said bore, the interior of said barrel defining a cylinder, a plunger independently rotatable and reciprocable in said barrel and sealingly extending through the other end thereof, a piston on said plunger within said cylinder said plunger having forwardly of said piston a cylindrical section of a diameter slightly greater than that of said sealing ring for sealing engagement therewith, noncircular means on the forward end of said cylindrical section for engagement with said noncircular means on said plug for rotating the latter by said plunger, a passageway extending through said plunger for communicating the exterior thereof adjacent said forward end thereof with said cylinder rearwardly of said piston, and means for venting the forward end of said cylinder to atmosphere.

References Cited in the file of this patent

UNITED STATES PATENTS

| | | |
|---|---|---|
| 1,631,564 | Van Raalte | June 7, 1927 |
| 2,050,985 | Trickey | Aug. 11, 1936 |
| 2,414,911 | Temple | Jan. 28, 1947 |
| 2,515,260 | Pichler | July 18, 1950 |
| 2,660,192 | Hunter | Nov. 24, 1953 |
| 2,827,913 | Wagner | Mar. 25, 1958 |
| 2,829,429 | Mueller | Apr. 8, 1958 |
| 2,839,075 | Mueller | June 17, 1958 |
| 2,911,859 | Longley | Nov. 10, 1959 |